Aug. 16, 1960    W. MESKAT ET AL    2,948,922
SCREW CONVEYOR
Original Filed Dec. 11, 1951

INVENTORS:
WALTER MESKAT. JURI PAWLOWSKI.
BY Burgess, Dinklage & Sprung

ATTORNEYS

United States Patent Office
2,948,922
Patented Aug. 16, 1960

2,948,922
SCREW CONVEYOR

Walter Meskat and Juri Pawlowski, Dormagen, Germany, assignors to Farbenfabriken Bayer Aktiengesellschaft, a corporation of Germany Original application Dec. 11, 1951, Ser. No. 261,016. Divided and this application May 24, 1956, Ser. No. 586,971

9 Claims. (Cl. 18—12)

This invention relates to new and useful improvements in screw conveyors and is a division of our copending application, Serial No. 261,016, filed December 11, 1951, now abandoned.

The invention more particularly relates to screw conveyors which are suitable for continuously milling, kneading, mixing, homogenizing and dosing solid, viscous or plastic material.

Screw conveyors having one or more single or multiple thread worms rotatably positioned in a housing or casing closely adjacent the walls thereof are known and have been used to knead and mix solid and liquid materials. It has furthermore been proposed to improve the mixing effect and to increase the residence time of the material being treated in the machine by adding conveyor wings or blades to impede the flow of material as the same is advanced by the screw or worm. Such arrangements, however, are only suitable for the treatment of granular material and may not be used for the treatment of viscous or plastic materials.

Figure 1:
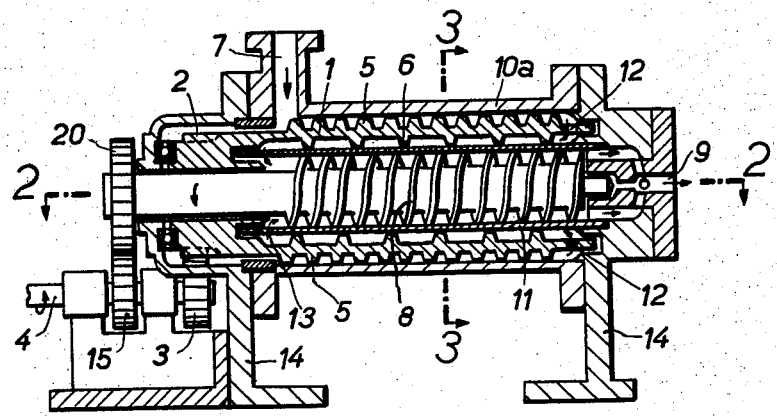
Figure 2:
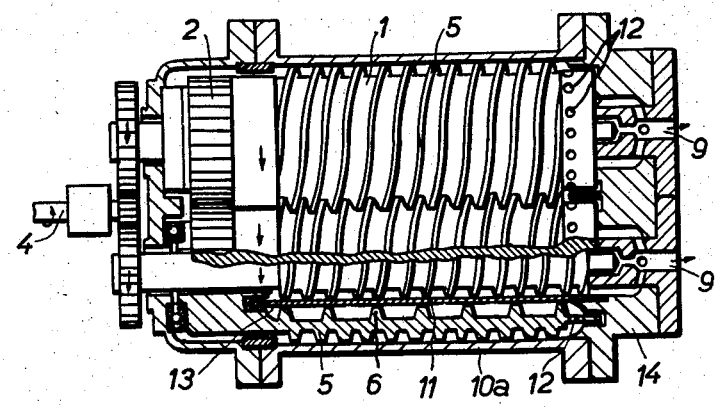
Figure 3:
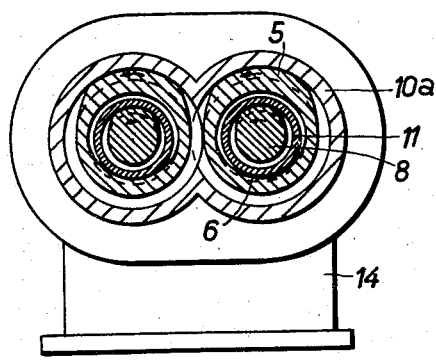

One object of this invention is an improved screw conveyor construction which is highly suitable for kneading, mixing, milling, homogenizing and dosing solid materials including viscous and plastic materials. This, and still further objects, will become apparent from the following description read in conjunction with the drawings in which:

Figure 1 is a vertical section of an embodiment of a screw conveyor in accordance with the invention with the central conveying screw and the drive gears being shown in elevation, Figure 2 is a plan view of the embodiment shown in Figure 1 with the upper portion of the housing cut away and with a portion of the outer worm cut away and shown in section, and Figure 3 is a cross-section of the embodiment shown in Figure 1.

The screw conveyor, in accordance with the invention, has a housing defining an inlet and an outlet and a hollow, tubular member rotatably positioned within the housing. The hollow, tubular member defines a worm thread along its inner and outer surface which is dimensioned and rotatable with the hollow, tubular member for conveying material from the inlet toward the outlet. A portion of the thread, and preferably the portion along the inner surface of the hollow, tubular member, defines a braking thread for exerting a smaller, counter-thrust against the conveying force of the remaining portion of the worm thread. A braking thread is a term intended to designate a thread which has a reverse pitch so as to tend to force the material in the opposite direction from that in which it is to be conveyed, but which force is overcome by the conveying force of the conveying thread.

Referring to the embodiment, as shown in the drawing, the screw conveyor has a casing or housing 10a with an inlet 7 and the two outlets 9. Rotatably mounted in the housing 10a, side by side, are two hollow, tubular members 1. The tubular members each have an external conveying worm thread 5 along its outer surface and an internal braking thread 6 along its inner surface. Openings 12 are defined through the tubular members 1 at their end portions opposed to the inlet 7. The two tubular members 1 are positioned in the housing side by side substantially parallel to each other with their external conveying worm threads meshing with each other and passing closely adjacent the casing wall. A drive gear 2 is rigidly mounted concentrically on each of the members 1 with the gears 2 meshing with a spar gear 3 mounted on the drive shaft 4 so that upon rotation of the drive shaft 4 the tubular members 1 will be forced to rotate in the same direction within the housing.

A separate tubular casing 11 is concentrically positioned within each of the tubular members 1 and rigidly connected to the housing. The external wall of the tubular casing 11 is positioned closely adjacent the internal braking worm threads 6. Openings 13 are defined through the walls of the tubular casing at their end portions adjacent the inlet 7.

Concentrically positioned within the tubular casing 11 is a rotatably mounted conveyor screw 8 with the worm threads positioned closely adjacent the inner wall of the tubular casing. The shaft of each of the conveying screws 8 extends outside of the housing and has concentrically connected thereto a drive gear 20. Each of the drive gears 20 meshes with a spur gear 15 also mounted on the drive shaft 4 so that as the drive shaft 4 rotates, the conveying worm 8 will be caused to rotate within the tubular casing 11. The outlets 9 from the housing are substantially coaxial with the conveying screws 8 and extend from the interior of the tubular casing 11 to the outside of the housing.

As shown in Figure 2, a portion of one of the hollow tubular members 1 and one of the tubular casings 11 is cut away so that these elements may be partially seen in sections and the exposed portion of the conveying screw 8 may be seen in elevation.

The entire housing is mounted on the stand or base 14.

In operation, the drive shaft 4 is rotated in the direction indicated by the arrows by any conventional drive means, as, for example, by an electric motor. This causes rotation of the spur gears 15 and 3, causing rotation of the drive gears 20 and 2 and their connected parts 8 and 1, all in the same direction.

Material to be treated is fed into the inlet 7 and is forced by the external conveying worm threads 5 along the housing wall toward the openings 12. As the external conveying worm threads 5 mesh with each other and rotate in the same direction, the relative velocity therebetween is twice their peripheral velocity, causing an excellent automatic cleaning effect providing a very good kneading and mixing action. As material is conveyed to the opening 12, the same is forced through these openings and forced against the action of the braking worm threads 6 along the external surface of the tubular casing 11 toward the opening 13. The conveying force of the external conveying worm thread 5 is greater than the counter force of the braking threads 6, so that the material is advanced in a direction opposite to the counter thrust of the braking threads and the material is subjected to an additional and increasing shearing action which greatly improves the mixing, kneading effect.

The conveying thread 5 and the braking thread 6 must be so constructed in relation to each other that the conveying force of the conveying thread 5 is greater than the opposed counter force of the braking thread 6. In general, the conveying force or pressure will be dependent upon the pitch of the thread and the number of threads. The pressure increases with a decreasing pitch of the thread and with an increasing number of threads. The conveying thread 5 must therefore have a smaller pitch and/or a greater number of threads than the braking thread 6. If the braking and conveying worms have the same number of threads, the pitch of the conveying thread must be less than the pitch of the braking thread. Conversely, if the threads have the same pitch, then the conveying worm must have a greater number of threads than the braking worm. Preferably, as shown in the drawing, the conveying worm has a greater number of threads with a lesser pitch than the braking worm.

As the material passes through the openings 13, the same is conveyed axially along the internal surface of the tubular casing 11 and forced out of the outlets 9.

The screw conveyor, in accordance with the invention, is particularly suitable for continuously kneading and mixing plastic materials and viscous or sticky liquids. The conveyor is not only suitable for mixing and kneading processes, but may also be used for effecting chemical reactions in which changes of the physical state of the reactants may occur and the acceleration of which depends upon the mixing and kneading procedures.

Furthermore, the conveyor may be used to carry out reactions in thin layers, whereby the heat of reaction may be easily supplied or removed. Additionally, the conveyors may be used as valves between spaces having different pressure heads, or for dosing material, while simultaneously advancing and homogenizing it. The through-put of the material may be varied as desired by using a variable speed transmission. It is also possible to use the brake screw threads as throttling members between reaction chambers.

While the invention has been described in detail with reference to the specific embodiments shown, various changes and modifications will become apparent to the skilled artisan which fall within the spirit of the invention and scope of the appended claims.

We claim:

1. Screw conveyor comprising housing defining an inlet and an outlet, a hollow, tubular member rotatably positioned within said housing defining a first worm thread along its outer surface and a second worm thread along its inner surface, said worm threads defining in series a substantially continuous path of flow for material in the direction from said inlet to said outlet and being dimensioned and rotatable with said hollow tubular member for conveying material along said path of flow, a portion of at least one of said worm threads defining a braking worm thread for exerting a smaller counter thrust against the greater conveying force of the remaining portion of said worm threads.

2. Screw conveyor, according to claim 1, in which the worm thread defined along the outer surface of said hollow, tubular member is a conveying worm thread and the worm thread defined along the inner surface of said tubular member is a braking worm thread.

3. Screw conveyor, according to claim 2, including a tubular casing concentrically positioned within said hollow, tubular member adjacent to said braking thread, and means defining a conveying screw rotatably positioned within said tubular casing for conveying material from said braking thread to said outlet, said tubular casing defining a passage therethrough from said braking thread to said conveying screw through which is forced the material as it is advanced past the braking worm thread by the greater force of the conveying worm thread.

4. Screw conveyor, according to claim 3, in which said inlet is defined at one end portion of said housing adjacent the outer surface of said hollow, tubular member, and said outlet is defined at the other end portion of said housing adjacent said conveying screw, and including an opening defined through said hollow, tubular member at the outlet end portion of said housing, said passage being defined through said tubular casing being positioned at the inlet end portion of said housing.

5. Screw conveyor, according to claim 4, including two, substantially similar, hollow, tubular members, tubular casings for rotation in the same direction and conveying screws positioned side by side in said housing with the conveying screws defined along the outer surfaces of said hollow, tubular members meshing with each other.

6. Screw conveyor, according to claim 1, including two substantially similar hollow, tubular members positioned side by side in said housing with the worm threads defined along their outer surfaces meshing.

7. Screw conveyor, according to claim 6, in which the worm threads defined along the outer surfaces of said hollow, tubular members are conveying worm threads having the same direction of pitch and including means for rotating said hollow, tubular members in the same direction.

8. Screw conveyor, according to claim 7, in which the worm threads defined along the inner surfaces of said hollow, tubular members are braking worm threads and including passages defined through said hollow, tubular members from said conveying threads to said worm threads.

9. Screw conveyor according to claim 1, in which the pitch of the braking worm thread is larger than the pitch of the conveying worm thread, and in which there are a greater number of threads along the length of the conveying worm thread than along the length of the braking worm thread.

References Cited in the file of this patent

UNITED STATES PATENTS

| | | |
|---|---|---|
| 1,516,841 | Buttfield | Nov. 25, 1924 |
| 2,048,286 | Pease | July 21, 1936 |
| 2,127,857 | Bond | Aug. 23, 1938 |
| 2,427,960 | Griffiths | Sept. 23, 1947 |
| 2,488,189 | Hanson | Nov. 15, 1949 |
| 2,543,894 | Colombo | Mar. 6, 1951 |
| 2,615,199 | Fuller | Oct. 28, 1952 |
| 2,653,351 | Henning | Sept. 29, 1953 |
| 2,662,243 | Schnuck et al. | Dec. 15, 1953 |

FOREIGN PATENTS

| | | |
|---|---|---|
| 902,287 | France | Nov. 27, 1944 |

UNITED STATES PATENT OFFICE
CERTIFICATE OF CORRECTION

Patent No. 2,948,922            August 16, 1960

Walter Meskat et al.

It is hereby certified that error appears in the printed specification of the above numbered patent requiring correction and that the said Letters Patent should read as corrected below.

Column 4, line 19, after "casings" strike out "for rotation in the same direction", and insert the same after "housing", in line 20, same column.

Signed and sealed this 11th day of April 1961.

(SEAL)
Attest:
ERNEST W. SWIDER

Attesting Officer

ARTHUR W. CROCKER
Acting Commissioner of Patents